(12) United States Patent
Vieth

(10) Patent No.: US 9,287,991 B2
(45) Date of Patent: Mar. 15, 2016

(54) LIGHT MODULE INTERLOCK SYSTEM

(71) Applicant: CHRISTIE DIGITAL SYSTEMS USA, INC., Cypress, CA (US)

(72) Inventor: Eric Vieth, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 352 days.

(21) Appl. No.: 13/653,662

(22) Filed: Oct. 17, 2012

(65) Prior Publication Data

US 2014/0105593 A1 Apr. 17, 2014

(51) Int. Cl.
*H04B 10/564* (2013.01)
*H04B 10/07* (2013.01)
*G02B 6/42* (2006.01)

(52) U.S. Cl.
CPC ............ *H04B 10/564* (2013.01); *G02B 6/4286* (2013.01); *H04B 2210/08* (2013.01)

(58) Field of Classification Search
CPC . H04B 10/564; H04B 2210/08; G02B 6/4286
USPC ...................................... 398/1–38
See application file for complete search history.

(56) References Cited

U.S. PATENT DOCUMENTS

| | | | |
|---|---|---|---|
| 4,812,641 A | 3/1989 | Ortiz, Jr. | |
| 4,994,675 A * | 2/1991 | Levin .................... | G01M 11/33 250/551 |
| 6,412,949 B1 * | 7/2002 | Halldorsson ............ | G02B 5/32 353/8 |
| 6,423,963 B1 * | 7/2002 | Wu .......................... | 250/227.14 |
| 6,480,634 B1 * | 11/2002 | Corrigan ............ | G02B 26/0808 348/E9.026 |
| 7,068,421 B2 * | 6/2006 | Tokura et al. ................. | 359/334 |
| 7,245,280 B2 * | 7/2007 | Park ........................ | G09G 3/02 345/82 |
| 7,860,399 B2 * | 12/2010 | Hsieh ........................... | 398/151 |
| 2002/0149810 A1 * | 10/2002 | Brown ................ | H04B 10/077 398/9 |
| 2003/0081920 A1 * | 5/2003 | Kamiya ........................ | 385/124 |
| 2003/0095303 A1 * | 5/2003 | Cunningham ..... | H04B 10/0799 398/140 |
| 2003/0113118 A1 * | 6/2003 | Bartur ........................... | 398/139 |
| 2004/0151496 A1 * | 8/2004 | Sawyers et al. ................. | 398/25 |
| 2005/0105900 A1 * | 5/2005 | Akimoto ................ | H04B 10/03 398/16 |
| 2008/0247752 A1 * | 10/2008 | Wang ................ | H04B 10/07955 398/22 |

(Continued)

FOREIGN PATENT DOCUMENTS

| | | |
|---|---|---|
| EP | 0138958 A1 | 9/1985 |
| GB | 2348063 A | 9/2000 |
| JP | 2010188368 A | 9/2010 |

OTHER PUBLICATIONS

European Patent Application No. EP 13188979.2 Partial Search Report dated Feb. 3, 2014.

*Primary Examiner* — Ken Vanderpuye
*Assistant Examiner* — Dibson Sanchez
(74) *Attorney, Agent, or Firm* — Perry + Currier, Inc.

(57) ABSTRACT

Described is a light module interlock system comprising: an optical cable enabled to transmit light of a first wavelength and a second wavelength different than the first wavelength; a first light module enabled to provide the first wavelength to the optical cable; a second light module enabled to provide the second wavelength to the optical cable; a sensor enabled to detect the first wavelength transmitted by the optical cable, the sensor located at an opposite end of the optical cable as the first light module; and an interlock in communication with the sensor, the interlock enabled to: disable the second light module when the sensor fails to detect the first wavelength, such that the second wavelength is no longer provided to the optical cable.

15 Claims, 12 Drawing Sheets

(56) References Cited

U.S. PATENT DOCUMENTS

| | | | | |
|---|---|---|---|---|
| 2010/0245780 A1* | 9/2010 | Abe | ................ | G03B 21/14 353/85 |
| 2011/0013905 A1* | 1/2011 | Wang | ................ | G01M 11/33 398/21 |
| 2011/0188000 A1* | 8/2011 | Kuriki | ................ | G02B 6/266 353/31 |
| 2012/0044459 A1* | 2/2012 | Klein | ................ | G03B 21/14 353/8 |

* cited by examiner

LIGHT MODULE INTERLOCK SYSTEM

FIELD

The specification relates generally to light module systems, and specifically to a light module interlock system.

BACKGROUND

In some light module systems, for example, light module systems in laser-based projector systems, the inadvertent emission of light may pose a serious risk to humans and/or to other system components. For example, the emission of laser radiation may be hazardous to human skin or eyes. Furthermore, system components not designed to withstand such exposure may be rendered inoperative or suffer catastrophic failure.

Examples of the dangerous scenarios that could arise during the operation of a light module system in which the destination optical components (e.g. projector components) are fed from the light module via an optical cable (e.g. fiber optic cable) include: breakage of the optical cable during operation of the light module system, disconnection of the optical cable from the light module, disconnection of the optical cable from the optical components and accidental power up of the light module when either end of the optical cable is disconnected from either the light module or the optical components.

SUMMARY

According to one implementation, there is provided a light module interlock system comprising: an optical cable enabled to transmit light of a first wavelength and a second wavelength different than the first wavelength; a first light module enabled to provide the first wavelength to the optical cable; a second light module enabled to provide the second wavelength to the optical cable; a sensor enabled to detect the first wavelength transmitted by the optical cable, the sensor located at an opposite end of the optical cable as the first light module; and an interlock in communication with the sensor. The interlock is enabled to disable the second light module when the sensor fails to detect the first wavelength, such that the second wavelength is no longer provided to the optical cable.

According to another implementation, the interlock is further enabled to enable the second light module when the sensor detects the first wavelength transmitted by the optical cable, such that the second wavelength is provided to the optical cable.

According to another implementation, the sensor is further enabled to: transmit fail data to the interlock when the sensor fails to detect the first wavelength transmitted by the optical cable. According to a related implementation, the interlock disables the second light module one or more of simultaneous of receipt of fail data from the sensor and upon receipt of the fail data from the sensor.

According to another implementation, the light module interlock system further comprises at least one mirror enabled to: separate the first wavelength and the second wavelength; and one or more of: direct the first wavelength to the sensor; direct the first wavelength to the optical cable; direct the second wavelength to the optical cable; and direct the second wavelength transmitted by the optical cable to projection optics. According to a related implementation, the at least one mirror comprises one or more of a hot mirror, a cold mirror and a dichroic mirror. According to another related implementation, the projection optics comprises one or more of a digital micromirror device (DMD), a projection lens, a mirror, a filter and a prism.

According to another implementation, the first light module comprises an infrared light module and the first wavelength comprises an infrared wavelength.

According to another implementation, the second light module comprises a laser light module and the light of the second wavelength comprises laser light.

According to another implementation, the light module interlock system further comprises an integrator enabled to homogenize the light of the second wavelength transmitted by the optical cable.

According to another implementation, the sensor is enabled to fail to detect the first wavelength when the first wavelength transmitted by the optical cable falls below a threshold intensity. According to a related implementation, one or more of the interlock and the sensor is further enabled to store a threshold intensity value and compare an intensity of the first wavelength transmitted by the optical cable to the threshold intensity value.

According to another implementation, the optical cable is further enabled to transmit the light of the first wavelength and the light of the second wavelength simultaneously.

According to another implementation, the interlock comprises one or more of a switch enabled to cut power to the second light module and a computer module enabled to power down the second light module.

According to another implementation, the interlock disables the second light module by preventing at least a portion of the light of the second wavelength from being transmitted to the optical cable.

According to another implementation, the light module interlock system further comprises at least one integrator enabled to homogenize light of the second wavelength transmitted by the optical cable.

According to another implementation, the light module interlock system further comprises: a plurality of optical cables, including the optical cable, each of the plurality of optical cables enabled to transmit light of the first wavelength and a respective wavelength different from the first wavelength; a plurality of first light modules, including the first light module, each of the plurality of first light modules enabled to provide the first wavelength to at least a respective optical cable of the plurality of optical cables; and a plurality of second light modules, including the second light module, each of the plurality of second light modules enabled to provide the respective wavelength to at least an associated optical cable of the plurality of optical cables; wherein the sensor is further enabled to detect the first wavelength transmitted by one or more of the plurality of optical cables. According to this implementation, the interlock is further enabled to disable at least one of the plurality of second light modules when the sensor fails to detect the first wavelength, such that at least one respective wavelength is no longer provided to at least one of the plurality of the optical cables.

According to a related implementation, the light module interlock system further comprises: a plurality of sensors, including the sensor, each of the plurality of sensors enabled to detect the first wavelength transmitted by one or more of the plurality of optical cables. According to this implementation, the interlock, in communication with the plurality of sensor, is further enabled to disable at least one of the plurality of second light modules when at least one of the plurality of sensors fails to detect the first wavelength, such that at least one respective wavelength is no longer provided to at least one of the plurality of the optical cables.

According to a related implementation, the light module interlock system further comprises a plurality of interlocks, including the interlock, in a one to one relationship with the plurality of sensors. Each of the plurality of interlocks is enabled to disable at least one of the plurality of second light modules when at least one of the plurality of sensors fails to detect the first wavelength, such that at least one respective wavelength is no longer provided to at least one of the plurality of the optical cables. According to a related implementation, when one of the plurality of sensors fails to detect the first wavelength transmitted by a respective associated optical cable, an associated one of the plurality of interlocks disables an associated second light module, such that the respective wavelength is no longer provided to the respective associated optical cable.

BRIEF DESCRIPTION OF THE DRAWINGS

For a better understanding of the various implementations described herein and to show more clearly how they may be carried into effect, reference will now be made, by way of example only, to the accompanying drawings in which.

DETAILED DESCRIPTION

It is noted that the term "optical cable" used herein refers to any cable or connection suitable for transmitting light of the first wavelength and light of the second wavelength, such as fiber optic cable. Further, the referred to "optical cable" can comprise a single optical fiber and up to any number of optical fibers suitable for the transmission of light of the first wavelength and light of the second wavelength in the described system. When the "optical cable" comprises more than one optical fiber, the "optical cable" can also be referred to as a "bundle".

Figure 1:
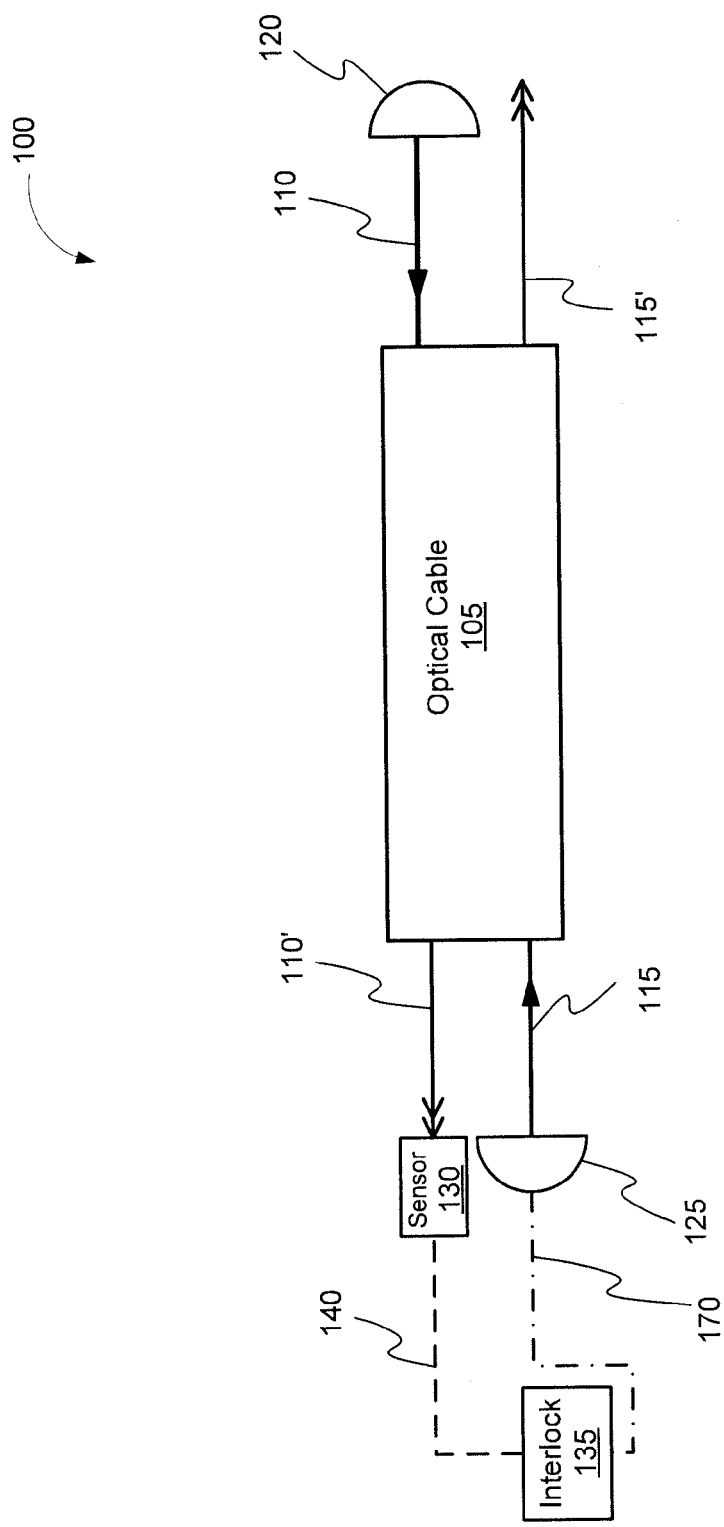
FIG. 1 depicts light module interlock system 100, according to non-limiting implementations.

FIG. 1 depicts light module interlock system 100 according to non-limiting implementations. Light module interlock system 100 comprises optical cable 105 enabled to transmit light of first wavelength 110 and light of a wavelength different than first wavelength 110, depicted as second wavelength 115. Light module interlock system 100 also comprises first light module 120 enabled to provide first wavelength 110 to optical cable 105 and second light module 125 enabled to provide second wavelength 115 to optical cable 105. Light module interlock system 100 further comprises sensor 130, enabled to detect first wavelength 110 transmitted by optical cable 105 and located at an opposite end of optical cable 105 to first light module 120, and interlock 135 in communication with sensor 130. Interlock 135 is enabled to disable second light module 125 when sensor 130 fails to detect first wavelength 110, such that second wavelength 115 is no longer provided to optical cable 105.

Optical cable 105 is enabled to transmit light of first wavelength 110 and of second wavelength 115. Second wavelength 115 is a different wavelength than first wavelength 110. According to some implementations, light of first wavelength 110 can comprise at least one non-visible wavelength, such as infrared radiation. It is noted that the term "non-visible wavelength" as used herein refers to light of a wavelength that is not visible, detectable or appreciated by the human eye.

According to some implementations, first wavelength 110 and second wavelength 115 are transmitted by optical cable 105 simultaneously.

Light of first wavelength 110 is provided to optical cable 105 by first light module 120. Light of second wavelength 115 is provided to optical cable 105 by second light module 125. According to some implementations, light of second wavelength 115 transmitted by optical cable 105 is further transmitted to destination optics, such as projection optics, lenses, prisms and the like (for example, see optics 655 of FIG. 6, described below), to project an image.

It is noted that light provided by each of first light module 120 and second light module 125 can comprise multiple wavelengths. For example, light provided by second light module 125 can comprise light of three wavelengths, including second wavelength 115. According to some implementations, the multiple wavelengths of each of the light of first wavelength 110 and the light of second wavelength 115 are different from one another.

Although FIG. 1 depicts first light module 120 and second light module 125 as located, relative to each other, at opposite ends of optical cable 105, according to some implementations, first light module 120 and second light module 125 can be located, relative to each other, at the same end of optical cable 105.

According to some implementations, first light module 120 comprises a light module enabled to provide light of a non-visible wavelength to optical cable 105, such as an infrared light module enabled to provide light of first light wavelength 110 in the form of infrared radiation. According to some implementations, second light module 125 comprises a laser light module and the light of second wavelength 115 comprises laser light.

For clarity, first wavelength 110 transmitted by optical cable 105 will be referred to herein as transmitted first wavelength 110' and second wavelength 115 transmitted by optical cable 105 will be referred to herein as transmitted second wavelength 115'.

Although FIG. 1 depicts transmitted first wavelength 110' in a different manner than first wavelength 110, according to some implementations, the properties of first wavelength 110' are at least substantially similar to the properties of first wavelength 110 (e.g. first wavelength 110 and transmitted first wavelength 110' are at least substantially the same wavelength). Similarly, according to some implementations, the properties of second wavelength 115' transmitted by optical cable 105 are at least substantially similar to second wavelength 115 (e.g. second wavelength 115 and transmitted second wavelength 115' are at least substantially the same wavelength).

Sensor 130 is located at an end of optical cable 105 opposite to first light module 120 and is enabled to receive and detect transmitted first wavelength 110'. According to some implementations, sensor 130 is at least partly enabled to detect transmitted first wavelength 110' by virtue of the position of sensor 130 in respect to transmitted first wavelength 110'. According to some implementations, transmitted first wavelength 110' is detected by sensor 130 indirectly from optical cable 105. For example, transmitted first wavelength 110' can be directed to sensor 130 using one or more mirrors enabled to direct transmitted first wavelength 110' to sensor 130. Sensor 130 comprises any device or devices suitable for the detection of transmitted first wavelength 110'. For example, sensor 130 can comprise a light-emitting diode (LED) light sensor, a charge-coupled device (CCD), an infrared sensor and a photodiode.

Interlock 135, in communication with sensor 130 (represented by communication path 140), is enabled to disable second light module 125 when sensor 130 fails to detect transmitted first wavelength 110', such that second wavelength 115 is no longer provided to optical cable 105. Interlock 135 comprises any suitable device or devices capable of disabling second light module 125. For example, interlock 135 can comprise a switch that cuts power to second light module 125, a computer module capable of powering down, putting "offline" or rendering inoperable second light module 125, temporarily and/or for an extended period of time.

According to some implementations, sensor 130 fails to detect transmitted first wavelength 110' when transmitted first wavelength 110' falls below a threshold intensity. For example, in the case of breakage of optical cable 105 (e.g. breakage of one or more optical fibers), a portion of light of first wavelength 110 may still be transmitted by optical cable 105 as transmitted first wavelength 110'. In this case, the overall intensity of transmitted first wavelength 110' will be lower than the initial intensity of first wavelength 110. However, transmitted first wavelength 110' may still be detectable to sensor 130. Since these are not likely optimal operating conditions, in such situations it may be desirable to engage interlock 135 to disable second light module 125. Establishing a threshold (e.g. minimum) intensity for sensor 130 to fail to detect transmitted first wavelength 110' in order for interlock 135 to disable and/or enable second light module 125, may provide an additional safety check against operating the overall light module system in non-optimal, and likely dangerous, conditions. According to some implementations, one or more of interlock 135 and sensor 130 is enabled to store the threshold intensity value (e.g. in a database or similar device) and compare the intensity of transmitted first wavelength 110' to the stored threshold intensity value.

It is noted that the term "intensity" as used herein describes properties of transmitted first wavelength 110' as detected by sensor 130 and not as detected, received or appreciated by the human eye.

According to some implementations, interlock 135 disables second light module 125 by preventing at least a portion of light of second wavelength 115 from being transmitted to optical cable 105. For example, interlock 135 can comprise a shutter mechanism that blocks at least a portion of light of second wavelength 115 from being outputted to optical cable 105. As a result, although second light module 125 remains "ON", interlock 135 prevents at least a portion of light of second wavelength 115 from being provided to optical cable 105, reducing the overall intensity of second wavelength 115 that would be emitted, for example, by disconnecting second light module 125 from optical cable 105 while second light module 125 is still "ON".

According to some implementations, interlock 135 is enabled to disable second light module 125 remotely, for example, by transmitting a command to power down, "turn-off" or activate another device or devices to disable second light module 125 (such as the above-described shutter mechanism). According to some implementations, interlock 135 is enabled to disable second light module via a wired electrical and/or a mechanical connection. According to some implementations, interlock 135 is enabled to interrupt power from a power source (not depicted) to second light module 125.

Although FIG. 1 depicts interlock 135 and second light module 125 as separate units or modules, according to some implementations, interlock 135 and second light module 125 can comprise a single unit and/or module.

Interlock 135 is in communication with sensor 130 via communication path 140. According to some implementations, interlock 135 and sensor 130 are in two-way communication with each other (i.e. interlock 135 can communicate or transmit data to sensor 130 and, vice-versa, sensor 130 can communicate or transmit data to interlock 135). According to some implementations, the communication between interlock 135 and sensor 130 is one-way.

However, any suitable manner of communication between interlock 135 and sensor 130 is contemplated. For example, interlock 135 can be remote from sensor 130 and communicate with sensor 130 wirelessly. In another example, interlock 135 and sensor 130 can be connected via wired connection and/or mechanical connection. Furthermore, although FIG. 1 depicts a particular path for communication between interlock 135 and sensor 130, it is contemplated that communication path 140 comprises any of one or more communication paths suitable for communication between interlock 135 and sensor 130. For example, communication path 140 can comprise any combination of wired and/or wireless communication paths as desired.

Similarly, according to some implementations, interlock 135 is in communication with second light module 125 (represented by communication path 170). According to some implementations, interlock 135 and second light module 125 are in two-way communication with each other (i.e. interlock 135 can communicate or transmit data to second light module 125, and, vice-versa, second light module 125 can communicate or transmit data to interlock 135). According to some implementations, the communication between interlock 135 and second light module 125 is one-way.

However, any suitable manner of communication between interlock 135 and second light module 125 is contemplated. For example, interlock 135 can be remote from second light module 125 and communicate with second light module 125 wirelessly. In another example, interlock 135 and second light module 125 can be connected via wired connection and/or mechanical connection. Furthermore, although FIG. 1 depicts a particular path for communication between interlock 135 and second light module 125, it is contemplated that communication path 170 comprises any of one or more communication paths suitable for communication between interlock 135 and second light module 125. For example, communication path 170 can comprise any combination of wired and/or wireless communication paths as desired.

According to some implementations, interlock 135 is further enabled to enable second light module 125 when sensor 130 detects transmitted first wavelength 110', such that second wavelength 115 is provided to optical cable 105.

For example, interlock 135 can act as a check for operating second light module 125 when certain conditions are not met, such as proper connection of optical cable 105 to second light module 125 and/or first light module 120, or proper operation of sensor 130. For example, if sensor 130 malfunctions and is unable to, or fails to, detect transmitted first wavelength 110', then interlock 135 will disable second light module 125. When sensor 130 detects transmitted first wavelength 110', which can indicate a proper connection between optical cable 105 and first light module 120, interlock 135 enables second light module 125 to provide second wavelength 115 to optical cable 105.

In another example, interlock 135 can resume provision of second wavelength 115 by second light module 125 to optical cable 105 after interlock has previously disabled second light module 125.

Figure 2:
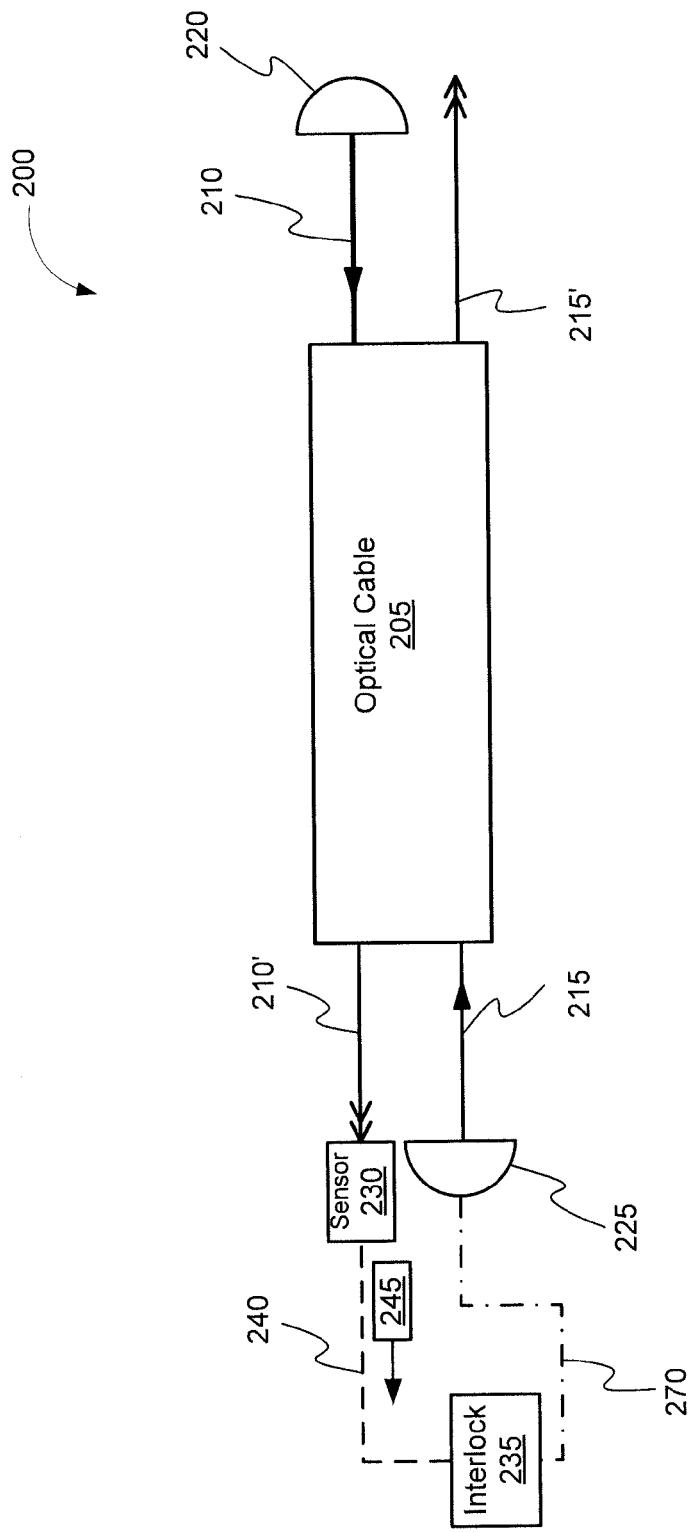
FIG. 2 depicts light module interlock system 200, according to non-limiting implementations.

Attention is next directed to FIG. 2, which depicts light module interlock system 200 according to non-limiting implementations and comprising elements similar to FIG. 1, with like elements having like numbers, however starting with a "2" rather than a "1". For example, light module interlock system 200 comprises optical cable 205 which is similar to optical cable 105. Light module interlock system 200 hence further comprises first light module 220, second light module 225, sensor 230 and interlock 235. Interlock 235 is in communication with sensor 230 via communication path 240 and in communication with second light module 225 via communication path 270

In system 200, sensor 230 is further enabled to transmit fail data 245 to interlock 235 when sensor 230 fails to detect transmitted first wavelength 210'. Fail data 245 comprises any data or information indicative of the failure of sensor 230 to detect transmitted first wavelength 210'. As stated above, sensor 230 may fail to detect transmitted first wavelength 210' as a result of, for example, a malfunction of sensor 230 and/or improper connection between optical cable 205 and first light module 220.

According to some implementations, interlock 235 disables second light module 225 upon receipt of fail data 245 from sensor 230. According to some implementations, interlock 235 disables second light module 225 one or more of simultaneous of the receipt of fail data 245, upon receipt of fail data 245, and the like.

Depending on the particular implementation of the light module interlock system and the configuration of the surrounding light module system components, the sensor, first light module and second light module of the hereto for described light module interlock systems may indirectly detect, provide or transmit the respective wavelength. In such implementations, at least one mirror, or other suitable device, can be employed to direct the respective wavelength to the particular component of the described light module interlock systems. It is noted that the term "mirror" as described herein comprises any suitable optical element capable of separating and/or directing the respective wavelengths. As such, filters, dichroic mirrors and similar optical elements are also contemplated as within the scope of the term "mirror" as described herein. Furthermore, the described "mirror" may not reflect all wavelengths, but can be enabled to transmit some wavelengths while reflecting others.

Figure 3:
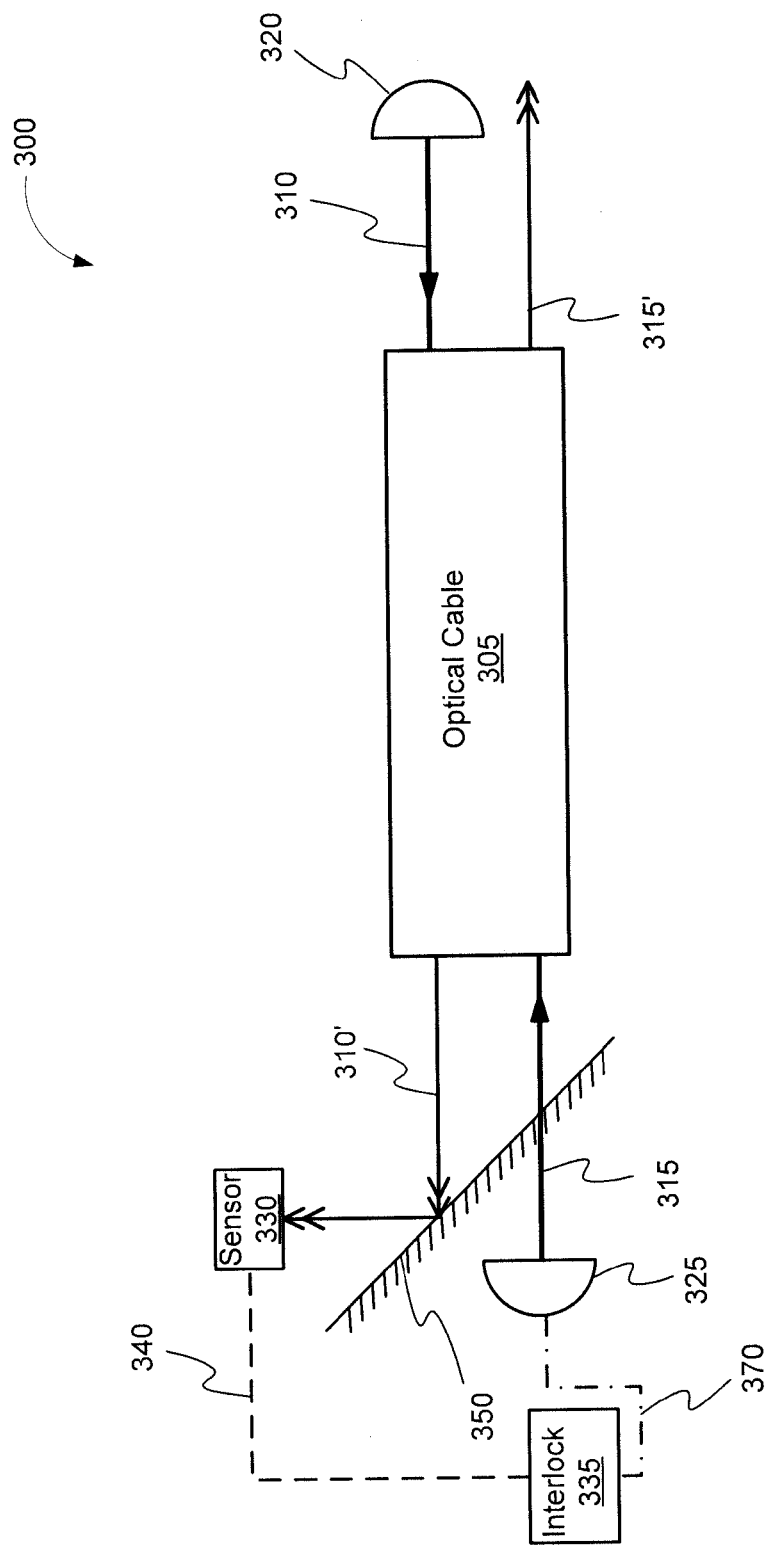
FIG. 3 depicts light module interlock system 300, according to non-limiting implementations.

Attention is directed to FIG. 3, which depicts light module interlock system 300, according to non-limiting implementations and comprising elements similar to FIG. 1, with like elements having like numbers, however starting with a "3" rather than a "1". For example, light module interlock system 300 comprises optical cable 305 which is similar to optical cable 105. Light module interlock system 300 further comprises first light module 320, second light module 325, sensor 330 and interlock 335. Interlock 335 is in communication with sensor 330 via communication path 340 and in communication with second light module 325 via communication path 370.

As depicted in FIG. 3, sensor 330 is located outside the path of transmitted first wavelength 310'. Mirror 350, located at the same end of optical cable 305 as second light module 325 and sensor 330 and enabled to separate transmitted first wavelength 310' and second wavelength 315, is employed to direct transmitted first wavelength 310' to sensor 330. For example, mirror 350 can be enabled to transmit second wavelength 315 and reflect transmitted wavelength 310' for detection by sensor 330.

Figure 4:
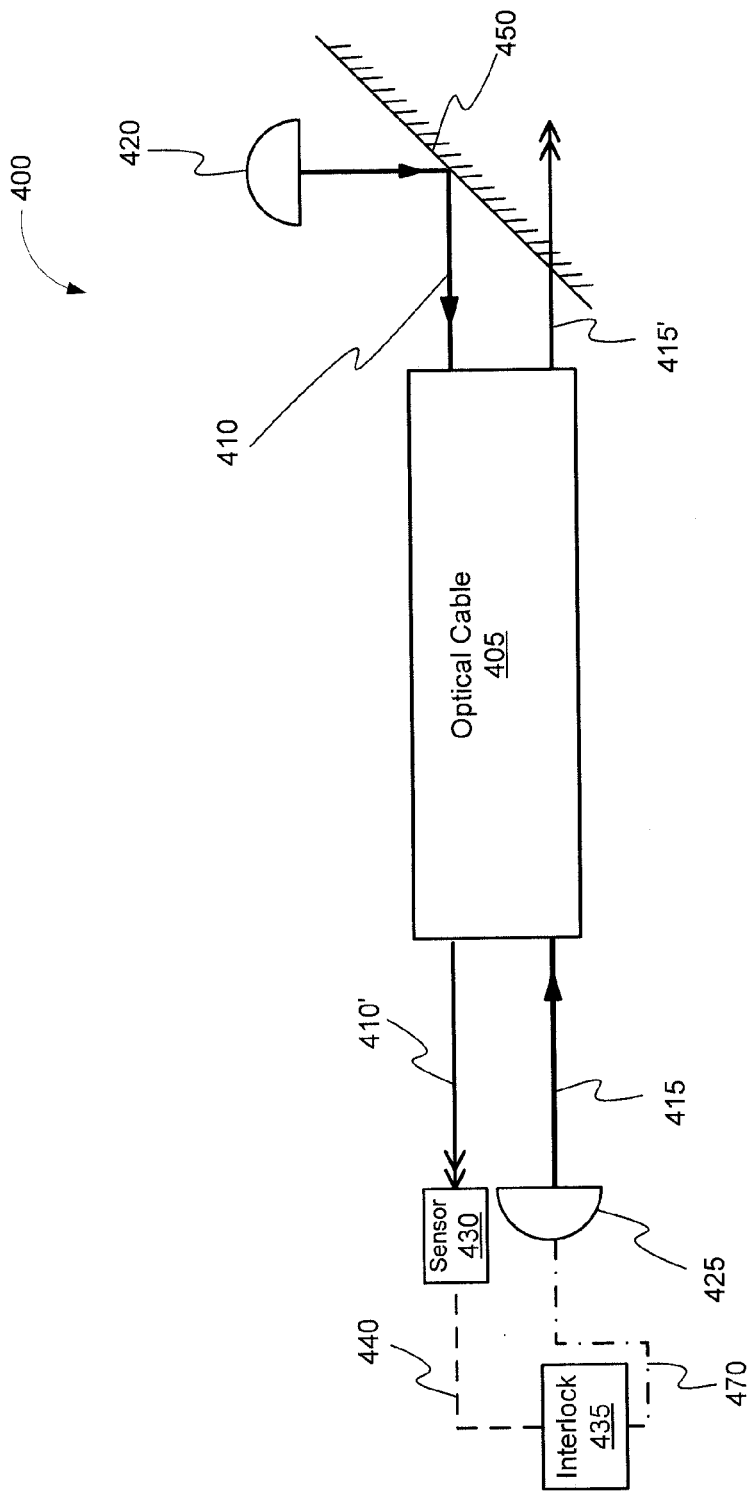
FIG. 4 depicts light module interlock system 400, according to non-limiting implementations.

Next, attention is directed to FIG. 4, which depicts light module interlock system 400, according to non-limiting implementations and comprising elements similar to FIG. 1, with like elements having like numbers, however starting with a "4" rather than a "1". For example, light module interlock system 400 comprises optical cable 405 which is similar to optical cable 105. Light module interlock system 400 further comprises first light module 420, second light module 425, sensor 430 and interlock 435. Interlock 435 is in communication with sensor 430 via communication path 440 and in communication with second light module 425 via communication path 470.

In light module interlock system 400, mirror 450 is located at the same end of optical cable 405 as first light module 420 and at an end of optical cable 405 opposite second module 425 and sensor 430. Mirror 450 is enabled to: separate transmitted second wavelength 415' and first wavelength 410; and direct first wavelength 410 to optical cable 405. For example, mirror 450 can be enabled to transmit transmitted second wavelength 415' and reflect wavelength 410 for transmission by optical cable 405.

Figure 5:
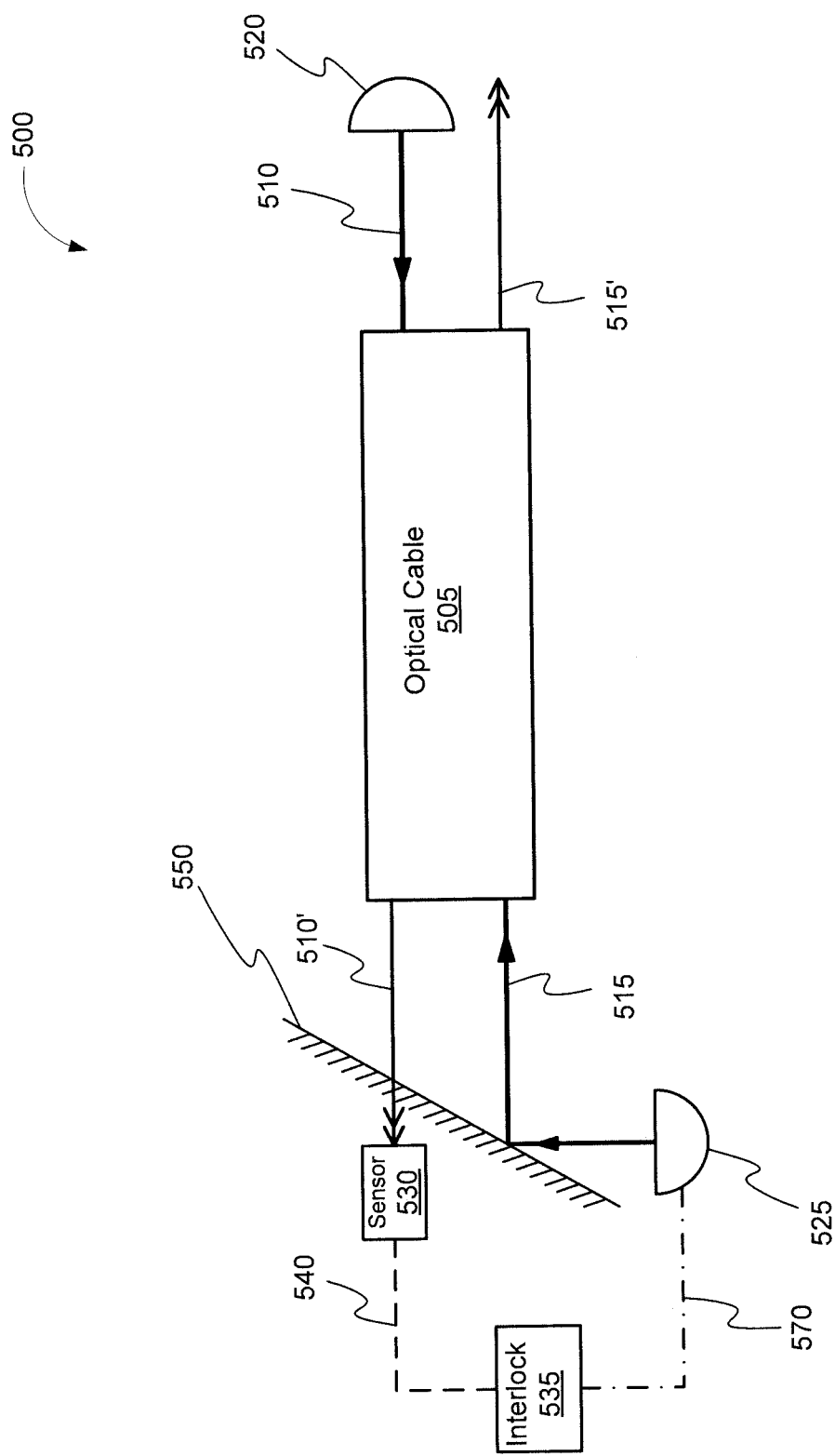
FIG. 5 depicts light module interlock system 500, according to non-limiting implementations.

Next, attention is directed to FIG. 5, which depicts light module interlock system 500, according to non-limiting implementations and comprising elements similar to FIG. 1, with like elements having like numbers, however starting with a "5" rather than a "1". For example, light module interlock system 500 comprises optical cable 505 which is similar to optical cable 105. Light module interlock system 500 further comprises first light module 520, second light module 525, sensor 530 and interlock 535. Interlock 535 is in communication with sensor 530 via communication path 540 and in communication with second light module via communication path 570.

In light module interlock system 500, mirror 550 is located at the same end of optical cable 505 as second light module 525 and sensor 530, and at an end of optical cable 505 opposite first module 520. Mirror 550 is enabled to separate transmitted first wavelength 510' and second wavelength 515, and to direct second wavelength 515 to optical cable 505. For example, mirror 550 can be enabled to transmit transmitted first wavelength 510' and reflect second wavelength 515 for transmission by optical cable 505.

Figure 6:
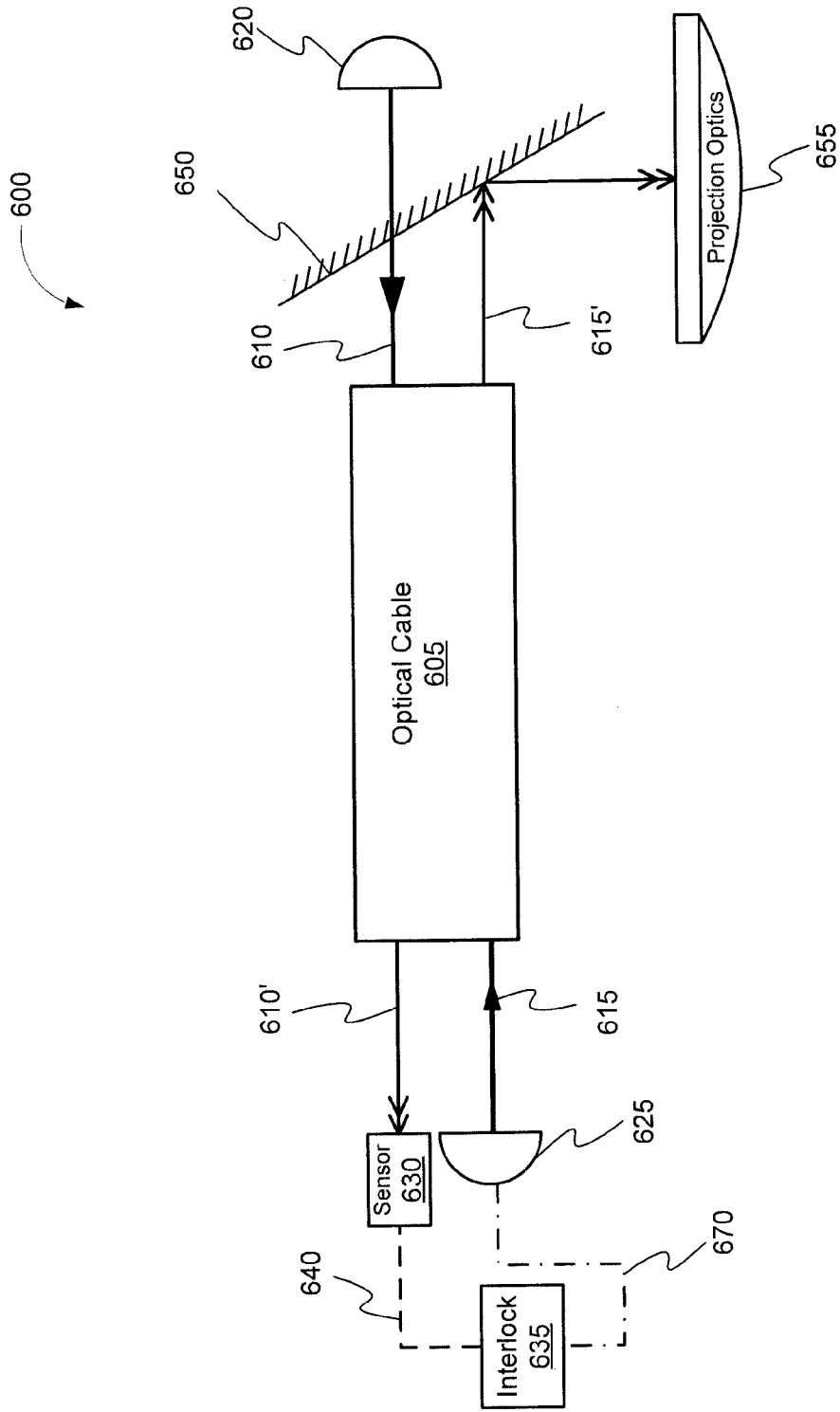
FIG. 6 depicts light module interlock system 600, according to non-limiting implementations.

Next, attention is directed to FIG. 6, which depicts light module interlock system 600, according to non-limiting implementations and comprising elements similar to FIG. 1, with like elements having like numbers, however starting with a "6" rather than a "1". For example, light module interlock system 600 comprises optical cable 605 which is similar to optical cable 105. Light module interlock system 600 further comprises first light module 620, second light module 625, sensor 630 and interlock 635. Interlock 635 is in communication with sensor 630 via communication path 640 and in communication with second light module 625 via communication path 670.

In light module interlock system 600, mirror 650 is located at the same end of optical cable 605 as first light module 620, opposite the end of optical cable 605 where second light module 625 and sensor 630 are located. Mirror 650 is enabled to separate first wavelength 610 and transmitted second wavelength 615', and to direct transmitted second wavelength 615' to optics 655. For example, mirror 650 can be enabled to transmit first wavelength 610 and reflect transmitted second wavelength 615'.

Optics 655 comprises any suitable optical system(s), device(s) and component(s) for the particular implementation, such as projection optics. For example, optics 655 can comprise one or more of a digital micromirror device (DMD), a projection lens, a mirror, a filter and a prism.

Although FIGS. 3 to 6 depict one mirror to direct and separate the respective wavelengths, any suitable number and combination of mirrors can be employed.

Figure 7:
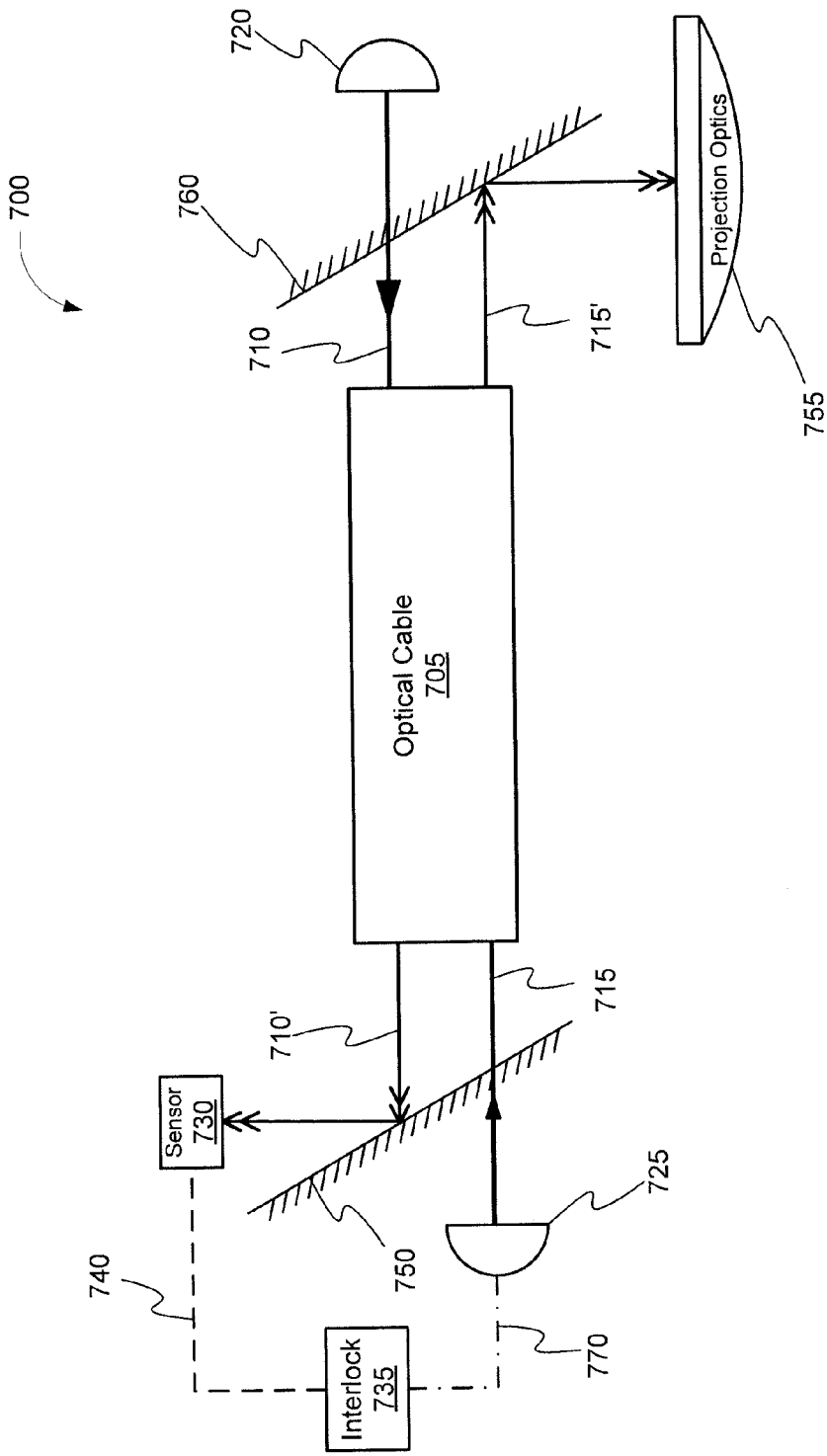
FIG. 7 depicts light module interlock system 700, according to non-limiting implementations.

For example, FIG. 7 depicts light module interlock system 700, according to non-limiting implementations and comprising elements similar to FIG. 1, with like elements having like numbers, however starting with a "7" rather than a "1". For example, light module interlock system 700 comprises optical cable 705 which is similar to optical cable 105. Light module interlock system 700 further comprises first light module 720, second light module 725, sensor 730 and interlock 735. Interlock 735 is in communication with sensor 730 via communication path 740 and in communication with second light module 725 via communication path 770.

Light module interlock system 700 employs two mirrors 750 and 760, to direct and separate first wavelength 710, transmitted first wavelength 710', second wavelength 715 and transmitted second wavelength 715'. Mirror 750, located at the same end of optical cable 705 as second light module 725 and sensor 730, is enabled to separate transmitted first wavelength 710' and second wavelength 715, and to direct transmitted first wavelength 710' to sensor 730. For example, mirror 750 can be enabled to transmit second wavelength 715 and reflect transmitted first wavelength 710'. Mirror 760, located at the same end of optical cable 705 as first light module 720, is enabled to separate first wavelength 710 and transmitted second wavelength 715', and direct transmitted second wavelength 715' to optics 755. For example, mirror 760 can be enabled to transmit first wavelength 710 and reflect transmitted second wavelength 715'.

Based upon the desired properties and configuration of the particular light module system, the mirror or mirrors employed in the described light module interlock systems can, for example, comprise one or more of a hot mirror, a cold mirror and a dichroic mirror. For example, in light module interlock system 700, mirror 750 can comprise a cold mirror (i.e. light of wavelengths in an infrared range are reflected, while visible light is transmitted; this assumes that wavelength 710' comprises infrared light) and mirror 760 can comprise a hot mirror (i.e. light of visible wavelengths are reflected, while infrared light is transmitted; this assumes that wavelength 710 comprises infrared light).

Figure 8:
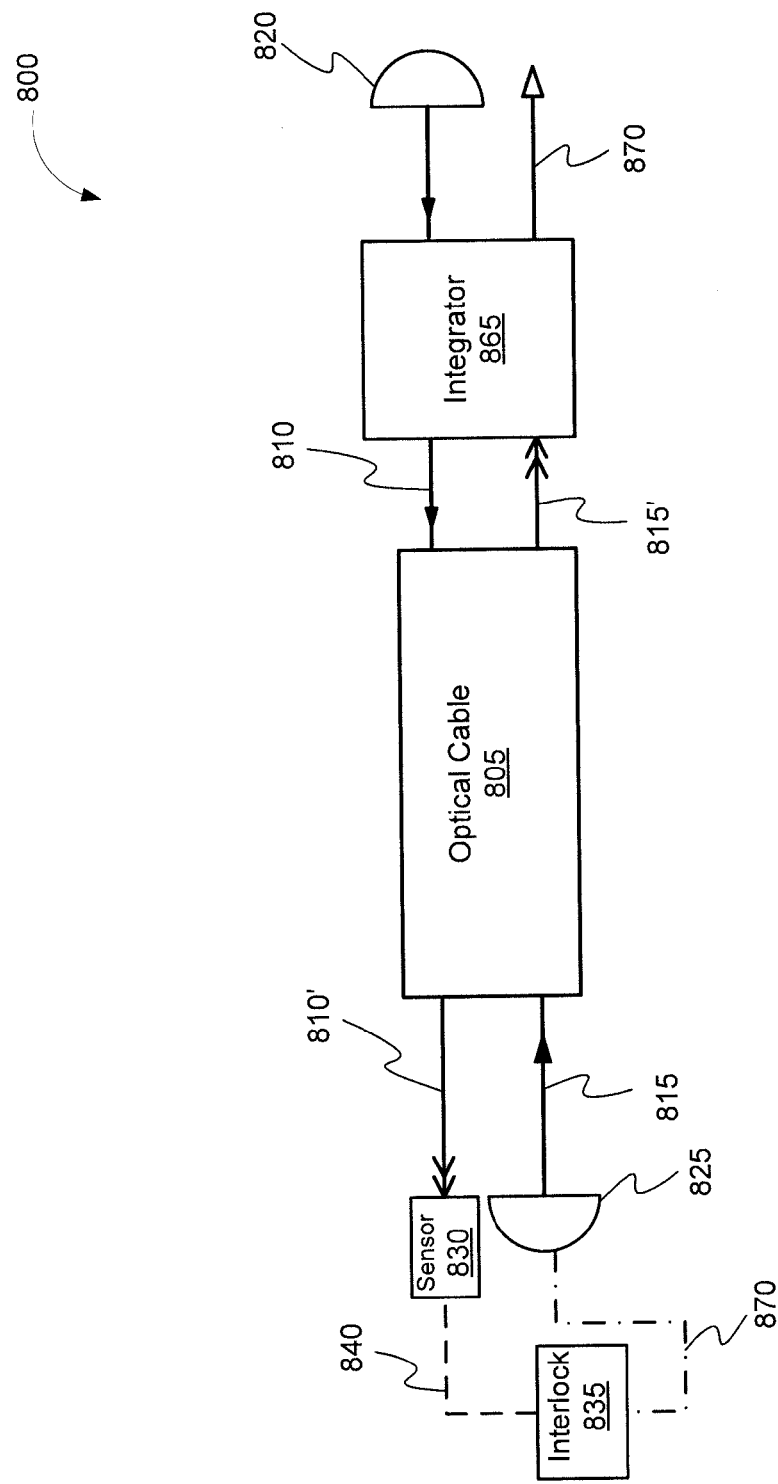
FIG. 8 depicts light module interlock system 800, according to non-limiting implementations.

It is contemplated that additional optical components can be employed as part of the described light module interlock systems. For example, FIG. 8 depicts light module interlock system 800, according to non-limiting implementations and comprising elements similar to FIG. 1, with like elements having like numbers, however starting with an "8" rather than a "1". For example, light module interlock system 800 comprises optical cable 805 which is similar to optical cable 105. Light module interlock system further comprises first light module 820, second light module 825, sensor 830, interlock 835 (in communication with sensor 830 via communication path 840 and in communication with second light module 825 via communication path 870) and integrator 865 enabled to homogenize light of transmitted second wavelength 815'. Homogenized light of transmitted second wavelength 815' is represented by element 870.

Integrator 865 comprises any suitable device or combination of devices enabled to homogenize light of transmitted second wavelength 815'. For example, integrator 865 can comprise one or more of a prism, a light pipe and an integrating rod.

Although FIG. 8 depicts integrator 865 as located between first light module 820 and optical cable 805, in some implementations, integrator 805 can be located after first light module 820 such that first light module 820 is located between optical cable 805 and integrator 865.

Although FIGS. 1 to 8 depict light module interlock systems comprising a single optical cable, first light module, second light module, sensor and interlock, many different configurations, comprising combinations of one or more of the above described components, are also contemplated. FIGS. 9 to 12 provide example implementations of the described light module interlock systems in which one or more of the above described components are employed.

Figure 9:
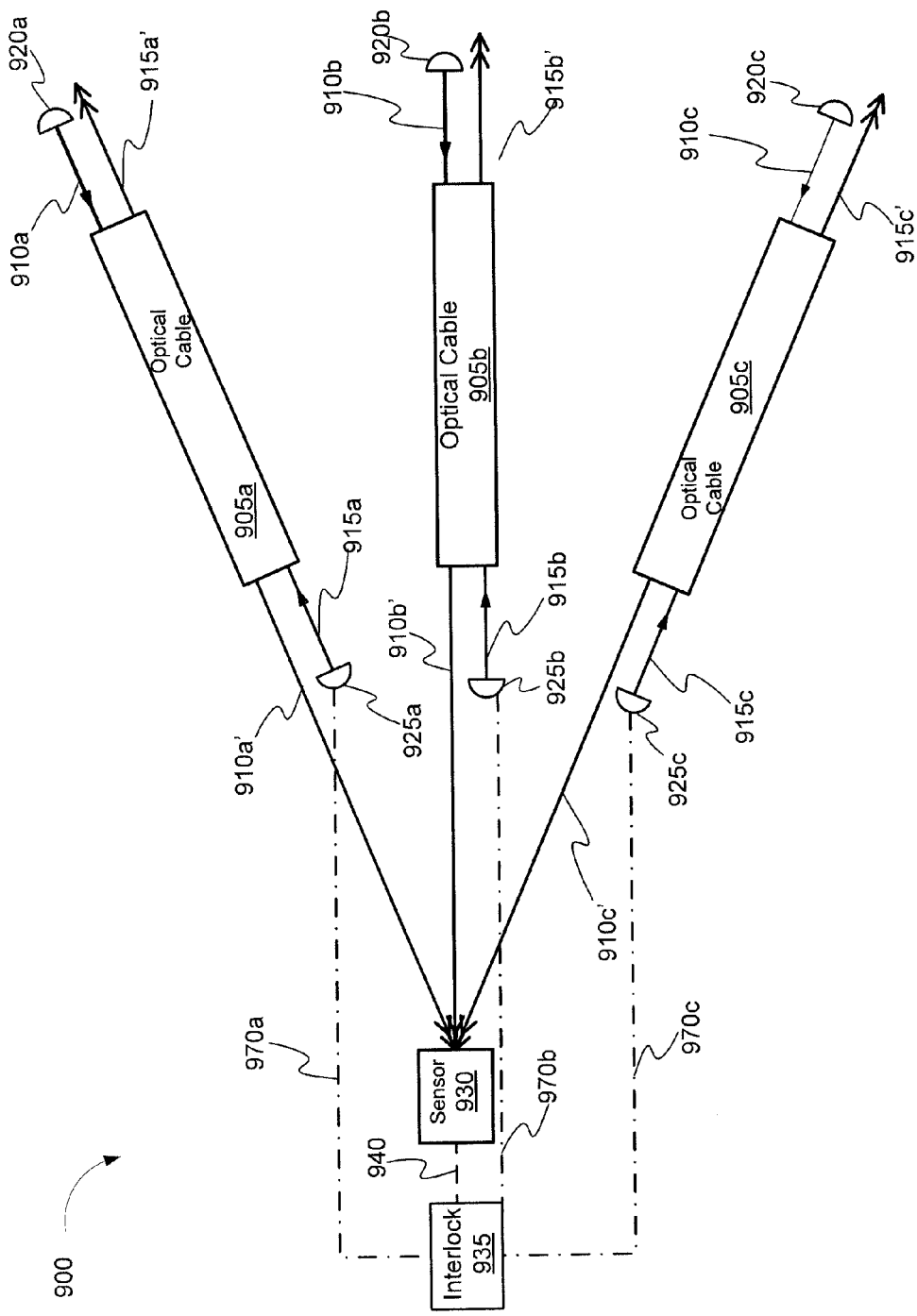
FIG. 9 depicts light module interlock system 900, according to non-limiting implementations.

Attention is directed to FIG. 9, which depicts light module interlock system 900, according to non-limiting implementations and comprising elements similar to FIG. 1, with like elements having like numbers, however starting with a "9" rather than a "1". For example, light module interlock system 900 comprises sensor 930, which is similar to sensor 130.

Light module interlock system 900 comprises a plurality of optical cables, 905a, 905b, 905c, referred to collectively as optical cables 905 and generically as an optical cable 905, enabled to transmit light of respective first wavelengths 910a, 910b and 910c and a wavelength different from respective first wavelengths 910a, 910b and 910c (depicted as respective second wavelengths 915a, 915b and 915c). Respective first wavelengths 910a, 910b, 910c will be interchangeably referred to hereafter, generically, as a first wavelength 910. Similarly respective second wavelengths 915a, 915b, 915c will be interchangeably referred to hereafter, generically, as a second wavelength 915. First light modules 920a, 920b and 920c (referred to collectively as first light modules 920 and generically as a first light module 920) are enabled to provide respective first wavelengths 910a, 910b and 910c, to at least respective optical cables 905a, 905b and 905c.

Second light modules 925a, 925b and 925c (referred to collectively as second light modules 925 and generically as second light module 925) are enabled to provide respective second wavelengths 915a, 915b and 915c to at least an associated optical cable of optical cables 905a, 905b and 905c.

Sensor 930 is enabled to detect transmitted first wavelength 910' transmitted by one or more of optical cables 905a, 905b and 905c. According to some implementations, sensor 930 is enabled to detect each of transmitted first wavelengths 910a', 910b' and 910c'. For example, in system 900, sensor 930 is positioned such that sensor 930 can directly detect (e.g. receive) each of first transmitted wavelengths 910a', 910b' and 910c'.

Interlock 935, in communication with sensor 930 via communication path 940, is enabled to disable at least one of second light modules 925a, 925b and 925c when sensor 930 fails to detect transmitted first wavelength 910', such that at least one of respective wavelengths 925a, 925b and 925c is no longer provided to at least one of optical cables 905a, 905b and 905c.

As depicted in FIG. 9, interlock 935 is in communication with second light modules 925a, 925b and 925c via communication paths 970a, 970b and 970c (referred to collectively as communication paths 970 and generically as a communication path 970).

In some implementations, interlock 935 disables all of second light modules 925a, 925b and 925c when sensor 930 fails to detect one or more of transmitted first wavelengths 910a', 910b' and 910c'. In other implementations, sensor 930 is enabled to distinguish between transmitted first wavelengths 910a', 910b' and 910c', and to determine which of the one or more transmitted first wavelengths 910a', 910b' and 910c' were not detected. In these implementations, interlock 935 is enabled to disable the one or more second light modules 925a, 925b and 925c associated with the one or more transmitted first wavelengths 910a', 910b' and 910c' that sensor 930 failed to detect. For example, in some implementations, sensor 930 is enabled to transmit data (not shown) to interlock 935 indicative of the one or more transmitted first wavelengths 910a', 910b' and 910c' sensor 930 failed to detect.

According to some implementations, sensor 930 fails to detect first transmitted wavelength 910' when the overall intensity of transmitted first wavelength 910' falls below a threshold intensity (e.g. a predetermined or expected level of intensity) of the combination of transmitted wavelengths 910a', 910b' and 910c'. According to some implementations, sensor 930 fails to detect transmitted first wavelength 910' when one or more of transmitted first wavelengths 910a', 910b' and 910c' fails to be received by sensor 930 and/or fails to be transmitted by respective optical cables 905a, 905b, 905c.

For example, in the case of breakage of optical cable 905a (e.g. breakage of one or more optical fibers), a portion of light of first wavelength 910b may be transmitted by optical cable 905b as transmitted first wavelength 910b'. In this case, the overall intensity of transmitted first wavelength 910' will be lower than the initial intensity of first wavelength 910. However, transmitted first wavelength 910' may still be detectable to sensor 930. Since these are not likely optimal operating conditions, in such situations it can be desirable to engage interlock 935 to disable second light modules 925. Establishing a threshold (e.g. minimum) intensity for sensor 930 to fail to detect transmitted first wavelength 910' in order for interlock 935 to disable and/or enable second light modules 925, can provide an additional safety check against operating the overall light module system in non-optimal, and likely dangerous, conditions. According to some implementations, one or more of interlock 935 and sensor 130 is enabled to store the threshold intensity value and compare the intensity of transmitted first wavelength 910' to the stored threshold intensity value. According to some implementations, interlock 135 is enabled to disable one or more of second light modules 925 when the intensity of transmitted first wavelength 910' falls below the threshold intensity.

Although FIG. 9 depicts only three optical cables, first light modules and second light modules, implementations in which one or more optical cables, first light modules and second light modules, including greater than three each of optical cables, first light modules and second light modules, are contemplated. For example, some implementations comprise two optical cables, while other implementations comprise four or more optical cables.

Furthermore, as in light module interlock system 800, it is contemplated that additional optical components can be employed as part of the described light module interlock systems. For example, at least one integrator (similar to integrator 865 shown in FIG. 8) can be located between first light modules 920a, 920b, 920c and optical cables 905a, 905b, 905c in order to homogenize light of transmitted second wavelengths 915a', 915b' and 915c'. According to some implementations, a respective integrator for each one of transmitted second wavelengths 915a', 915b' and 915c' is enabled to homogenize light of at least one respective transmitted second wavelength 915'. According to some implementations, one integrator is enabled to homogenize light of transmitted wavelengths 915a', 915b' and 915c'. For example, one or more mirrors can be enabled to direct one or more of transmitted second wavelengths 915b', 915b' and 915c' to an integrator.

Figure 10:
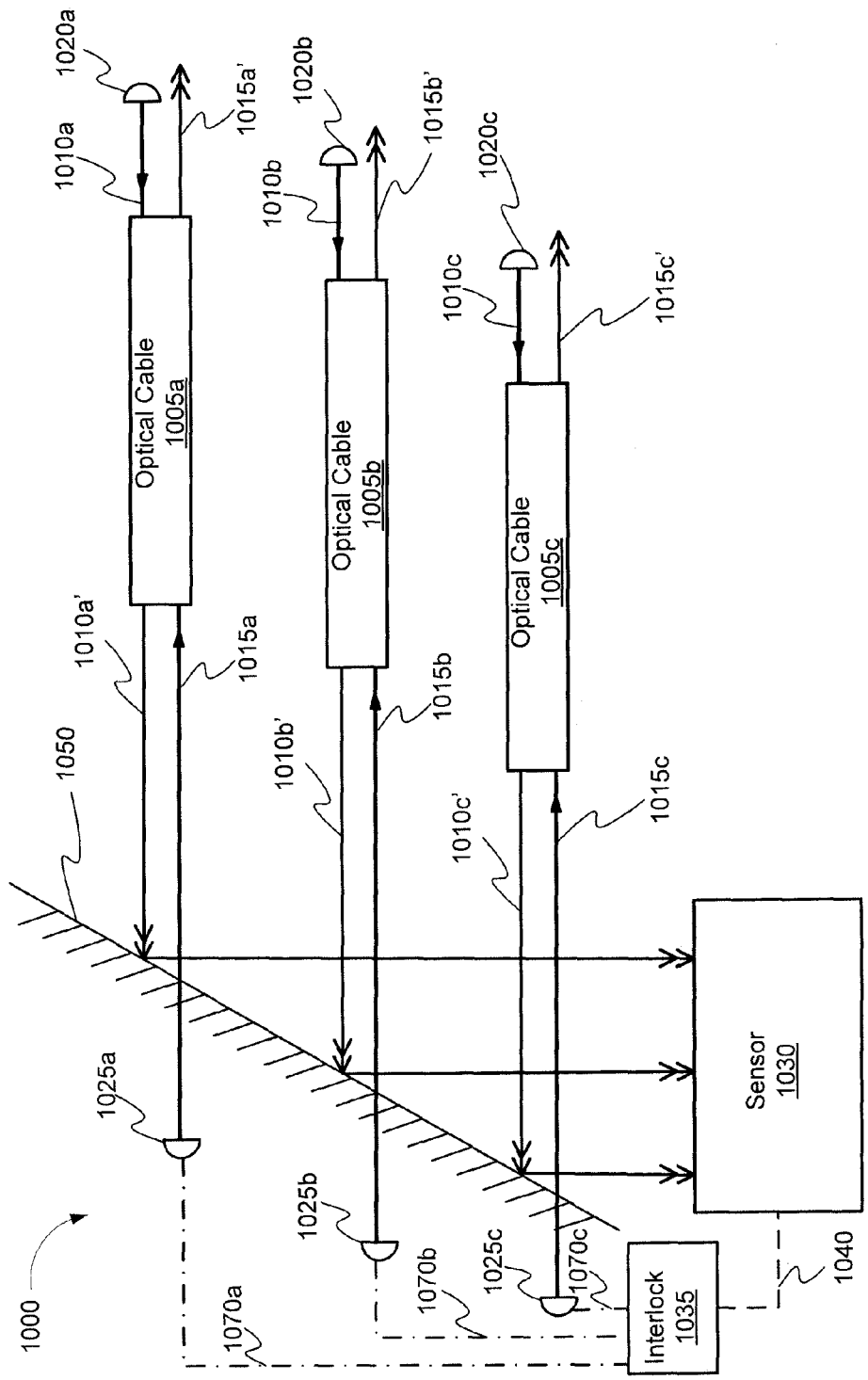
FIG. 10 depicts light module interlock system 1000, according to non-limiting implementations.

Next, attention is directed to FIG. 10, which depicts light module interlock system 1000, according to non-limiting implementations and comprising elements similar to FIG. 1, with like elements having like numbers, however starting with a "10" rather than a "1". For example, light module interlock system 1000 comprises sensor 1030 which is similar to sensor 130. Light module interlock system 100 further comprises optical cables 1005a, 1005b, 1005c (referred to collectively as optical cables 1005 and generically as an optical cable 1005), first light modules 1020a, 1020b and 1020c (referred to collectively as first light modules 1020 and generically as a first light module 1020), second light modules 1025a, 1025b and 1025c (referred to collectively as second light modules 1025 and generically as a second light module 1020), sensor 1030 and interlock 1035. Interlock 1035 is in communication with sensor 1030 via communication path 1040 and in communication with second light modules 1025a, 1025b and 1025c via communication paths 1070a, 1070b and 1070c (referred to collectively as communication paths 1070 and generically as a communication path 1070).

First light modules 1020a, 1020b and 1020c are enabled to provide light of respective first wavelengths 1010a, 1010b and 1010c to respective optical cables 1005a, 1005b, 1005c. Respective first wavelengths 1010a, 1010b, 1010c will be interchangeably referred to hereafter, generically, as a first wavelength 1010. Second light modules 1025a, 1025b and 1025c are enabled to provide light of a respective wavelength different than respective first wavelengths 1010a, 1010b and 1010c (depicted as respective second wavelengths 1015a, 1015b and 1015c) to at least respective optical cables 1005a, 1005b and 1005c. Similarly respective second wavelengths 1015a, 1015b, 1015c will be interchangeably referred to hereafter, generically, as a second wavelength 1015.

In light module interlock system 1000, mirror 1050 is generally located at the same end of optical cables 1005 as second light modules 1025. Mirror 1050 is enabled to separate a respective transmitted first wavelength 1010' (referred to individually as transmitted first wavelengths 1010a', 1010b' and 1010c') and second wavelength 1015, and to direct respective transmitted first wavelengths 1010a', 1010b' and 1010c' to sensor 1030. For example, mirror 1050 can be enabled to transmit respective second wavelengths 1015a, 1015b and 1015c and reflect respective transmitted first wavelengths 1010a', 1010b' and 1010c'. According to some implementations, more than one mirror is enabled to separate, transmit and direct the respective wavelength and transmitted wavelength.

As described above, transmitted second wavelength 1015' (referred to individually as transmitted second wavelengths 1015a', 1015b' and 1015c') can, in some implementations, be directed to projection optics.

Figure 11:
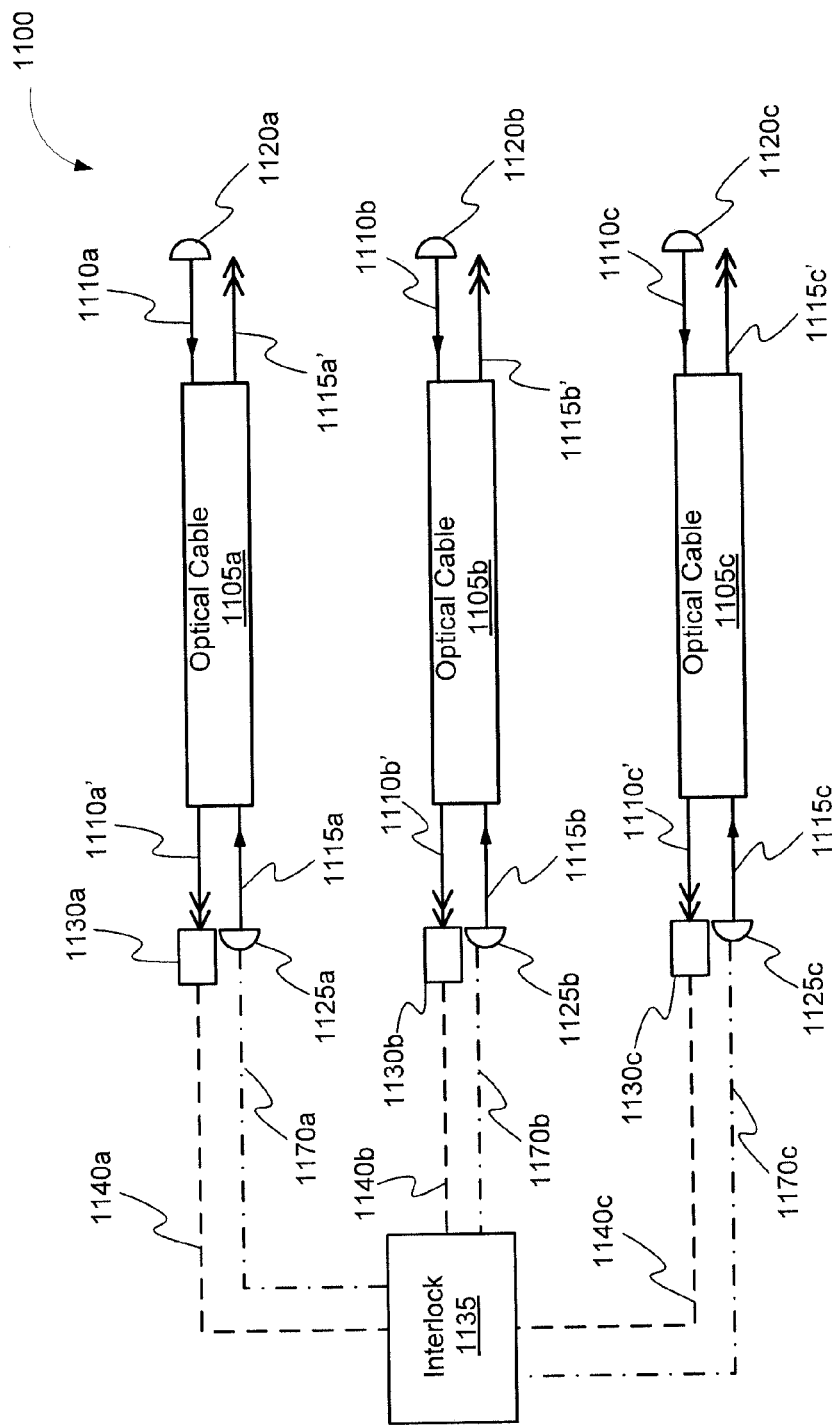
FIG. 11 depicts light module interlock system 1100, according to non-limiting implementations.

Next, attention is directed to FIG. 11, which depicts light module interlock system 1100, according to non-limiting implementations and comprising elements similar to FIG. 1, with like elements having like numbers, however starting with an "11" rather than a "1". For example, light module interlock system 1100 comprises interlock 1135 which is similar to interlock 135. Light module interlock system 1100 further comprises optical cables 1105a, 1105b, 1105c (referred to collectively as optical cables 1105 and generically as a optical cable 1105), first light modules 1120a, 1120b, 1120c (referred to collectively as first light modules 1120 and generically as a first light module 1120), second light modules 1125a, 1125b, 1125c (referred to collectively as second light modules 1125 and generically as a second light module 1125), sensors 1130a, 1130b, 1130c (referred to collectively as sensors 1130 and generically as a sensor 1130) and interlock 1135. Interlock 1135 is in communication with sensors 1130a, 1130b, 1130c via communication paths 1140a, 1140b, 1140c (referred to collectively as communication paths 1140 and generically as a communication path 1140) and in communication with second light modules 1125a, 1125b and 1125c via communication paths 1170a, 1170b and 1170c (referred to collectively as communication paths 1170 and generically as a communication path 1170).

In light module interlock system 1100, optical cables 1105 are enabled to transmit light of respective first wavelengths 1110a, 1110b and 1110c and a wavelength different from respective first wavelengths 1110a, 1110b, 1110c (depicted as respective second wavelengths 1115a, 1115b and 1115c). Respective first wavelengths 1110a, 1110b, 1110c will be interchangeably referred to hereafter, generically, as a first wavelength 1110. Similarly respective second wavelengths 1115a, 1115b, 1115c will be interchangeably referred to hereafter, generically, as a second wavelength 1115.

First light modules 1120a, 1120b and 1120c are enabled to provide respective first wavelengths 1110a, 1110b and 1110c, to at least respective optical cables 1105a, 1105b and 1105c. Second light modules 1125a, 1125b and 1125c are enabled to provide respective second wavelengths 1115a, 1115b and 1115c to at least an associated optical cable of optical cables 1105a, 1105b and 1105c.

Sensors 1130a, 1130b and 1130c are enabled to detect respective transmitted first wavelengths 1110a', 1110b' and 1110c' from one or more of respective optical cables 1105a, 1105b and 1105c. According to some implementations, sensors 1130a, 1130b and 1130c are enabled to, detect respective transmitted first wavelengths 1110a', 1110b' and 1110c'. According to some implementations, sensors 1130a, 1130b and 1130c are each enabled to detect respective transmitted first wavelengths 1110a', 1110b' and 1110c'.

Interlock 1135 is enabled to disable at least one of second light modules 1125a, 1125b and 1125c when at least one of sensors 1130a, 1130b and 1130c fails to detect respective transmitted first wavelengths 1110a', 1110b', 1110c' such that at least one of respective second wavelengths 1115a, 1115b and 1115c is no longer provided to at least one of optical cables 1105a, 1105b and 1105c. For example, according to some implementations, if sensor 1130b fails to detect transmitted first wavelength 1110b', interlock 1135 can disable only second light module 1125b or interlock 1135 can also disable second light module 1125a and/or second light module 1125c. For example, according to some related implementations, sensor 1130b transmits data (not depicted) indicative of a failure to detect transmitted first wavelength 1110b' to interlock 1135, enabling interlock 1135 to particularly identify second light module 1125b for disabling as described above.

Figure 12:
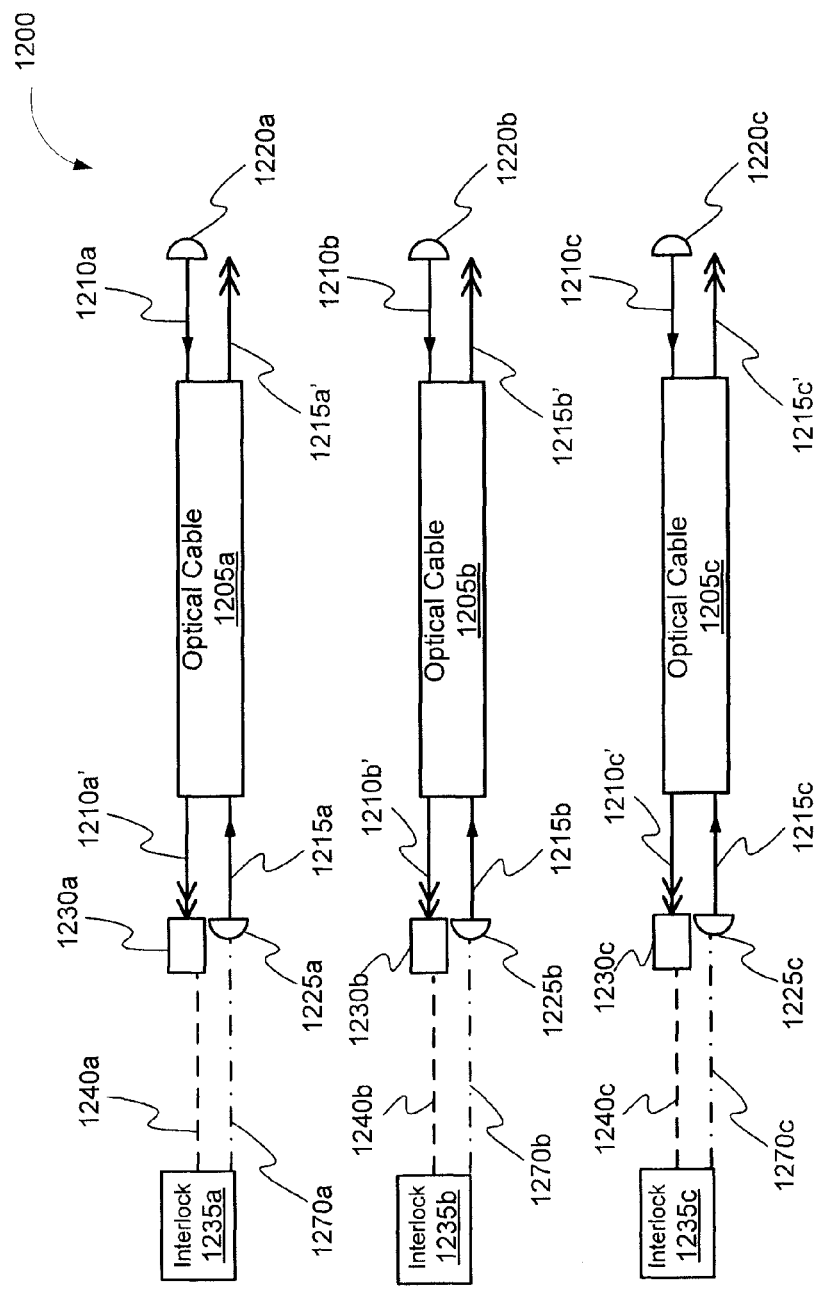
FIG. 12 depicts light module interlock system 1200, according to non-limiting implementations.

Next, attention is directed to FIG. 12, which depicts light module interlock system 1200, according to non-limiting implementations and comprising elements similar to FIG. 1, with like elements having like numbers, however starting with a "12" rather than a "1". For example, light module interlock system 1200 comprises optical cables 1205a, 1205b, 1205c (referred to collectively as optical cables 1205 and generically as an optical cable 1205). Light module interlock system 1200 further comprises first light modules 1220a, 1220b, 1220c (referred to collectively as first light modules 1220 and generically as a first light module 1220), second light modules 1225a, 1225b, 1225c (referred to collectively as second light modules 1225 and generically as a second light module 1225), sensors 1230a, 1230b, 1230c (referred to collectively as sensors 1230 and generically as a sensor 1230) and interlocks 1235a, 1235b, 1235c (referred to collectively as interlocks 1235 and generically as an interlock 1235). Interlocks 1235a, 1235b, 1235c are in communication with sensors 1230a, 1230b, 1230c via communication paths 1240a, 1240b and 1240c (referred to collectively as communication paths 1240 and generically as a communication path 1240) and in communication with second light modules 1225a, 1225b and 1225c (referred to collectively as communication paths 1270 and generically as a communication path 1270).

In light module interlock system 1200, optical cables 1205a, 1205b, 1205c are enabled to transmit light of respective first wavelengths 1210a, 1210b and 1210c and a wavelength different from respective first wavelengths 1210a, 1210b, 1201 c (depicted as respective second wavelengths 1215a, 1215b and 1215c). Respective first wavelengths 1210a, 1210b, 1210c will be interchangeably referred to hereafter, generically, as a first wavelength 1210. Similarly, respective second wavelengths 1215a, 1215b, 1215c will be interchangeably referred to hereafter, generically, as a second wavelength 1215.

First light modules 1220a, 1220b and 1220c are enabled to provide respective first wavelengths 1210a, 1210b and 1210c, to at least respective optical cables 1205a, 1205b and 1205c. Second light modules 1225a, 1225b and 1225c are enabled to provide respective second wavelengths 1215a, 1215b and 1215c to at least an associated optical cable of optical cables 1205a, 1205b and 1205c.

Sensors 1230a, 1230b and 1230c are enabled to detect respective transmitted first wavelengths 1210a', 1210b' and 1210c' from one or more of optical cables 1205a, 1205b and 1205c. According to some implementations, sensors 1230a, 1230b and 1230c are enabled to detect respective transmitted first wavelengths 1210a', 1210b' and 1210c'. According to some implementations, sensors 1230a, 1230b and 1230c are each enabled to detect respective transmitted first wavelengths 1210a', 1210b' and 1210c'.

Interlocks 1235a, 1235b and 1235c, in communication with and in a one-to-one relationship with sensors 1230a, 1230b and 1230c, are each enabled to disable at least one of second light modules 1225a, 1225b and 1225c when at least one of sensors 1230a, 1230b and 1230c fails to detect respective transmitted first wavelengths 1210a', 1210b', 1210c', such that at least one of respective second wavelengths 1215a, 1215b and 1215c is no longer provided to at least one of optical cables 1205a, 1205b and 1205c.

According to some implementations, when one of sensors 1230a, 1230b and 1230c fails to detect respective transmitted first wavelengths 1210a', 1210b' and 1210c' from a respective optical cable of optical cables 1205a, 1205b and 1205c, an associated one of interlocks 1235a, 1235b and 1235c disables an associated one of second light modules 1225a, 1225b and 1225c such that the respective second wavelength of second wavelengths 1215a, 1215b and 1215c is no longer provided to the associated optical cable of optical cables 1205a, 1205b and 1205c.

For example, if sensor 1230a fails to detect respective transmitted first wavelength 1210a', then interlock 1235a, associated with sensor 1230a, disables second light module 1225a, also associated with interlock 1235a, such that second wavelength 1215a is no longer provided to optical cable 1205a. In this example, neither of interlocks 1235b and 1235c will disable associated second light modules 1225b and 1225c until associated sensors 1230b and 1230c fail to detect respective transmitted first wavelengths 1210b' and 1210c'.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A light module interlock system comprising:
   a plurality of optical cables, each of the plurality of optical cables configured to transmit light of a respective first wavelength and a respective second wavelength different than the respective first wavelength, each of the plurality of optical cables further configured to convey the second wavelength to projection optics;
   a plurality of first light emitters in a one-to-one relationship with the plurality of optical cables, each respective first light emitter, of the plurality of first light emitters, configured to emit the respective first wavelength to a respective optical cable of the plurality of optical cables, each of the plurality of first light emitters comprising a non-visible light emitter and the respective first wavelength comprises a non-visible wavelength that is non-visible to a human eye, each of respective first wavelengths emitted by the plurality of first light emitters being different from each other;
   a plurality of second light emitters in a one-to-one relationship with the plurality of optical cables, each respective second light emitter, of the plurality of second light emitters, configured to emit the respective second wavelength to the respective optical cable, the respective second light emitter located at an opposite end of the respective optical cable as the respective first light emitter of the plurality of optical cables, each of the plurality of second light emitters comprising a laser and the light of the respective second wavelength comprises laser light that is visible to the human eye;
   a sensor configured to: detect, and distinguish between, the respective first wavelengths transmitted by respective optical cables from each of the plurality of first light emitters, the sensor located at a respective opposite end of the plurality of optical cables as the respective first light emitters, the sensor configured to detect when an intensity of one or more of the respective first wavelengths falls below a threshold intensity, the threshold intensity lower than a respective initial intensity of one or more of the respective first wavelengths; and
   an interlock in communication with the sensor, the interlock configured to:
      when the sensor detects that a respective intensity of one or more of the respective first wavelengths falls below the threshold intensity, disable the plurality of second light emitters associated with the respective first wavelengths that have fallen below the threshold intensity.

2. The light module interlock system of claim 1, wherein the interlock is further configured to: enable the plurality of second light emitters associated with the respective first wavelengths that have fallen below the threshold intensity when the sensor detects that the intensity of is above the threshold intensity.

3. The light module interlock system of claim 1, wherein the sensor is further configured to: transmit respective fail data to the interlock when the sensor detects that the intensity of one or more of the respective first wavelengths falls below the threshold intensity.

4. The light module interlock system of claim 3, wherein the interlock disables the respective second light emitter one or more of: simultaneous of receipt of respective fail data from sensor; and upon receipt of the respective fail data from the sensor.

5. The light module interlock system of claim 1, further comprising at least one mirror configured to: separate the respective first wavelength and the respective second wavelength; and one or more of:
   direct the respective first wavelength to the sensor;
   direct the respective first wavelength to the respective optical cable;
   direct the respective second wavelength to the respective optical cable; and
   direct the respective second wavelength transmitted by the respective optical cable to the projection optics.

6. The light module interlock system of claim 5, wherein the at least one mirror comprises one or more of a hot mirror, a cold mirror and a dichroic mirror.

7. The light module interlock system of claim 5, wherein the projection optics comprises one or more of a digital micromirror device (DMD), a projection lens, a mirror, a filter and a prism.

8. The light module interlock system of claim 1, wherein the first light module comprises an infrared light module and the first wavelength comprises an infrared wavelength.

9. The light module interlock system of claim 1, further comprising at least one integrator configured to homogenize the light of respective second wavelengths transmitted by the plurality of optical cables.

10. The light module interlock system of claim 1, wherein each of the plurality of optical cables is further configured to transmit the light of the respective first wavelength and the light of the respective second wavelength simultaneously.

11. The light module interlock system of claim 1, wherein the interlock comprises one or more of a switch configured to cut power to each of the plurality second light emitters, independent of one another, and a computer module configured to power down each of the plurality of second light emitters, independent of one another.

12. The light module interlock system of claim 1, wherein the interlock disables each of the plurality the second light emitters by preventing at least a portion of the light of the respective second wavelength from being transmitted to the respective optical cable.

13. The light module interlock system of claim 1, further comprising at least one integrator configured to homogenize light of each respective second wavelengths transmitted by the plurality of optical cables.

14. The light module interlock system of claim 1, further comprising:
   a plurality of interlocks, including the interlock configured to:

disable a respective second light emitter when the sensor detects that the intensity of one or more of the respective first wavelengths falls below the threshold intensity.

15. The light module interlock system of claim 14, wherein:
when the sensor detects that the intensity of one or more of the respective first wavelengths falls below the threshold intensity an associated one of the plurality of interlocks disables an associated second light emitter, such that the respective wavelength is no longer provided to the respective associated optical cable.

\* \* \* \* \*